United States Patent [19]

Kem et al.

[11] Patent Number: 5,023,870
[45] Date of Patent: Jun. 11, 1991

[54] INTERFACE CIRCUIT FOR DATA TRANSMISSION BETWEEN A MICROPROCESSOR SYSTEM AND A TIME-DIVISION-MULTIPLEXED SYSTEM

[75] Inventor: Han Kem, Glendale, Ariz.

[73] Assignee: AG Communication Systems Corporation, Phoenix, Ariz.

[21] Appl. No.: 369,885

[22] Filed: Jun. 22, 1989

[51] Int. Cl.⁵ .............................................. H04J 3/06
[52] U.S. Cl. ................................. 370/85.2; 370/100.1
[58] Field of Search ...................... 370/61, 68.1, 85.1, 370/85.2, 85.3, 103, 110.1, 100.1; 340/825.5, 825.05

[56] References Cited

U.S. PATENT DOCUMENTS 4,910,507 3/1990 Shimizu et al. .................. 370/85.2

Primary Examiner—Douglas W. Olms
Assistant Examiner—Melvin Marcelo
Attorney, Agent, or Firm—Anthony J. Baca

[57] ABSTRACT

The circuit of the present invention provides a signal which allows data to be transferred between a first synchronous system to a second synchronous system. Where the first synchronous system is a Time-Division-Multiplexing (TDM) system and the second synchronous system is a Microprocessor system. The transfer is allowed at the end of the assigned time slot provided that the microprocessor is not accessing the data. If the microprocessor is accessing the data, then the transfer is delayed for three clock cycles of the TDM clock. After the delay, if the microprocessor is still accessing the data, the transfer is delayed again. The delaying continues until the microprocessor is no longer accessing the data, at which time the transfer is allowed.

10 Claims, 2 Drawing Sheets

INTERFACE CIRCUIT FOR DATA TRANSMISSION BETWEEN A MICROPROCESSOR SYSTEM AND A TIME-DIVISION-MULTIPLEXED SYSTEM

FIELD OF THE INVENTION

The present invention relates in general to digital logic circuits, and more particularly to a circuit that allows a first synchronous system to interface to a second synchronous system.

BACKGROUND OF THE INVENTION

Synchronous systems require that data be stable at specific, predefined time periods. Should the data change during these time periods, it may be improperly interpreted. More specifically, when a microprocessor accesses data, the data must not change during critical portions of the access cycle.

Modern digital Telecommunication systems use multiple microprocessors to execute the complex software which controls the Telecommunication systems. These microprocessors are considered synchronous systems, but quite often are not synchronized to each other. In addition, the microprocessors are not synchronized to the Time-Division-Multiplexed (TDM) data.

TDM data is a synchronous serial data stream divided into several time slots. Where each time slot carries Pulse Coded modulation (PCM) voice samples. Should the microprocessor need to access the TDM data, some form of translation between the microprocessor synchronous system and the TDM synchronous system must be performed.

Microprocessors generally access data in a parallel format while, TDM data is generally in a serial format. Therefore, a serial-to-parallel converter is used to transfer the data from the TDM data stream to the microprocessor, and a parallel-to-serial converter is used to transfer the data from the microprocessor to the TDM data stream.

In prior art implementations, the microprocessor accesses the converters directly. Should the microprocessor try to access a converter while the data is being serially shifted, the microprocessor is placed in a HOLD condition. Once the data is shifted in, the microprocessor is released from the HOLD condition and normal processing can resume.

The present invention precludes placing the microprocessor in a HOLD condition and therefore consumes less processing time. The present invention adds a latch between the microprocessor and the serial-to-parallel converter. But, the data must still be transferred between the latches and the converters at an appropriate time. The present invention determines when this transfer is to occur.

Accordingly, it is the objective of the present invention to provide a synchronous interface circuit which allows a synchronous microprocessor to access a synchronous Time-Division-Multiplexed (TDM) data stream.

SUMMARY OF THE INVENTION

In accomplishing the objective of the present invention there is provided a synchronizing circuit for generating a transfer signal that indicates when data is to be transferred through an interface circuit. The interface circuit is connected between a microprocessor system and a time-division-multiplexed system.

The synchronizing circuit includes a collision detector that is connected between the time-division-multiplexed system and the microprocessor system. The collision detector generates a collision signal when the time-division-multiplexed system and the microprocessor system request use of the interface circuit simultaneously. Alternatively, the collision detector generates the transfer signal when a request for use of the interface circuit is received from either the time-division-multiplexed system or the microprocessor system.

The synchronizing circuit further includes a delay circuit that delays the collision signal from the collision detector. The delayed collision signal is sent back to the collision detector. Responsive to the collision detector receiving the delayed collision signal the collision detector continues to generate the collision signal until the microprocessor system retracts the request for use of the interface circuit.

DESCRIPTION OF THE DRAWINGS

A better understanding of the invention may be had from the consideration of the following detailed description taken in conjunction with the accompanying drawings in which.

DESCRIPTION OF THE PREFERRED EMBODIMENT

Figure 1:
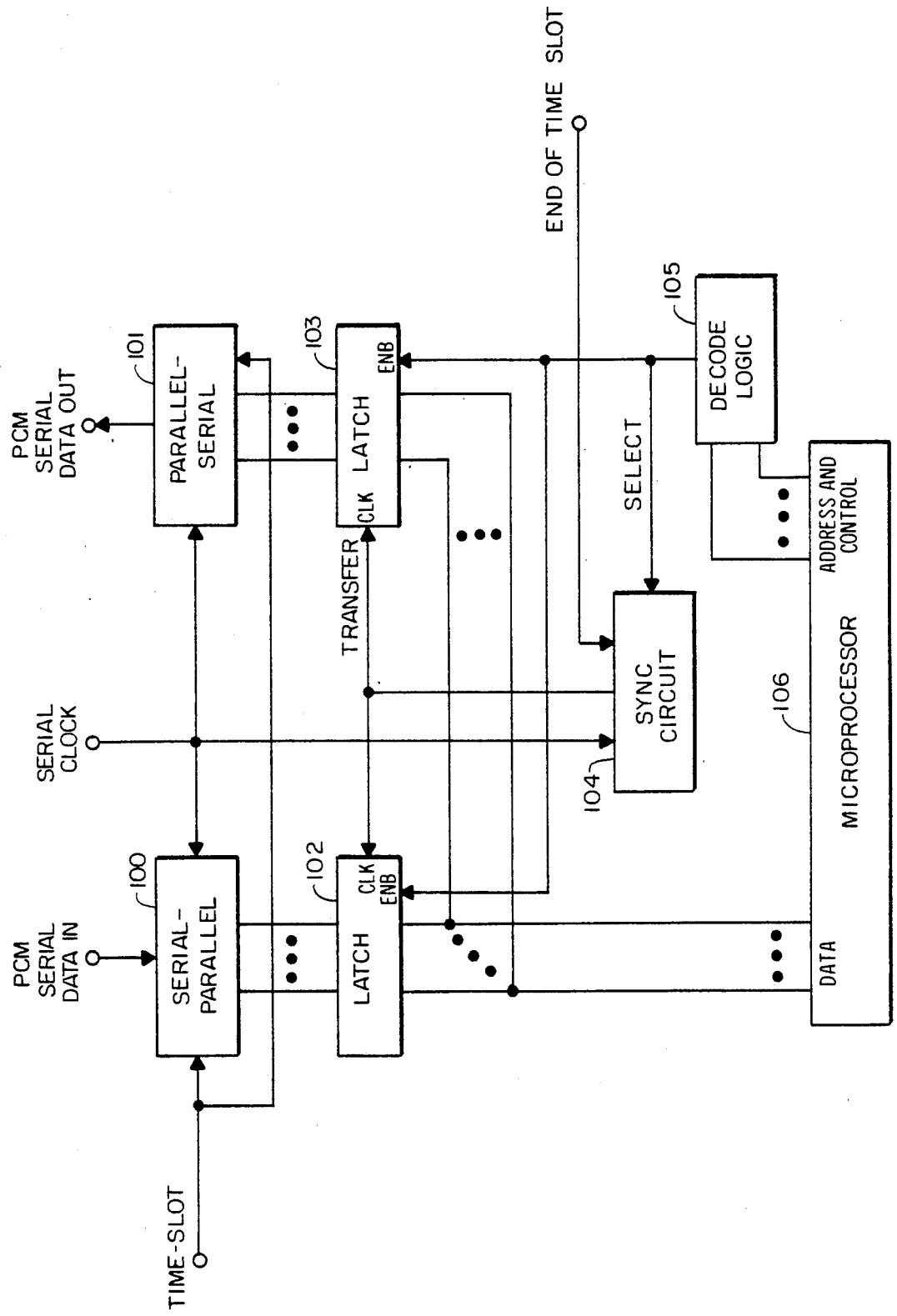
FIG. 1 is a block diagram of the interface circuit.
Figure 2:
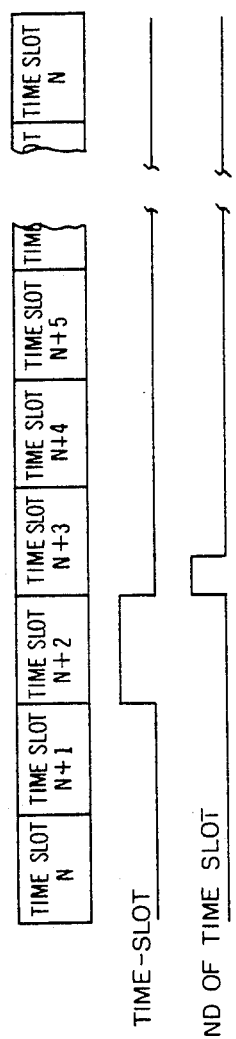
FIG. 2 is a timing diagram for the block diagram of FIG. 1, showing the structure of the serial data stream and selected control signals.

Turning to FIGS. 1 and 2, a general description of the present invention will be given.

FIG. 2 shows the structure of a TDM data link. The TDM data link is divided into N time slots, where each time slot carries PCM voice data. A SERIAL CLOCK signal is used to define the individual bits within each time slot. And a TIME-SLOT signal defines a given time slot of the serial data.

Before the data can be accessed by microprocessor 106, a translation must be performed. Because both the TDM and the microprocessor are synchronous systems, yet asynchronous to each other, the data must be converted from one system time period to the other.

For TDM data to be read by microprocessor 106, it must first be converted from serial to parallel by serial-to-parallel converter 100. Latch 102, at the appropriate time latches the data from serial-to-parallel converter 100. The latched data can then be read by microprocessor 106.

For microprocessor 106 to write data to the TDM data stream, it writes the data to latch 103. The data is then transferred, at the appropriate time, from latch 103 to parallel-to-serial converter 101. During the assigned time slot, the data is shifted out of parallel-to-serial converter 101 onto the TDM serial data stream.

A problem exists as to when to transfer the data between the latches and the converters. Latch 102 cannot be updated while the data is being shifted into serial-to-parallel converter 100 or while microprocessor 106 is reading from latch 102. Parallel-to-serial converter 101 cannot be updated while the data is being shifted out of parallel-to-serial converter 101 or while microprocessor 106 is writing to latch 103.

The present invention provides a SYNC CIRCUIT 104 that arbitrates and determines when to update latch 102 and parallel-to-serial converter 101.

SYNC CIRCUIT 104 generates the transfer signal upon receiving the end of time slot signal provided that microprocessor 106 is not accessing the latches. If microprocessor 106 is accessing the data, then the transfer is delayed for three clock cycles of the serial clock (SER_CLK). After the delay, if microprocessor 106 is still accessing the latches, the transfer is delayed again. This continues until microprocessor 106 is no longer accessing the data, at which time the transfer is allowed.

Figure 3:
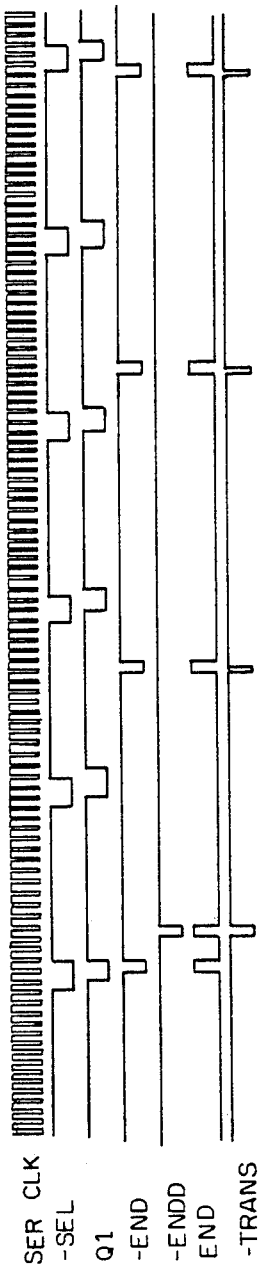
FIG. 3 is a timing diagram for the circuit of FIG. 4, showing selected signals over time.
Figure 4:
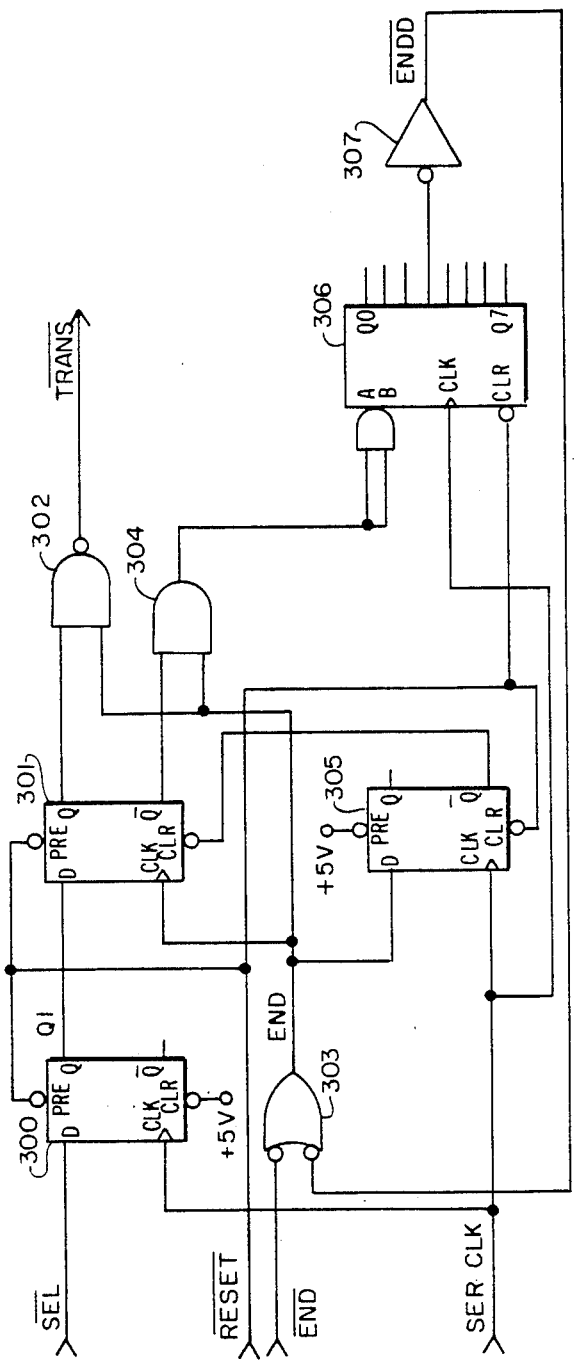
FIG. 4 is a schematic diagram of the synchronizer circuit, in accordance with the present invention.

Referring to FIGS. 3 and 4, a detailed description of the operation of the circuit of the present invention will be given.

The synchronous interface circuit of the present invention accepts various input signals and generates a single output signal (—TRANS) which initiates the transfer process. Input signals include; —SEL which indicates that microprocessor 106 is accessing the interface circuit, —END which signals the end of the assigned time slot, SER_CLK is the TDM serial clock, and -RESET forces the circuit to a known state.

The synchronous circuit has three separate states for the input signals: (1) no select activity, (2) normal select activity, and (3) select and end of time slot overlap.

In the first state, -SEL is not asserted by microprocessor 106 therefore, a logic HIGH is present at the D input of D-FF 300. This forces Q1 to remain at a logic HIGH also. Gate 303 inverts -END to produce END which is fed to D-FFs 301 and 305. The rising edge of END clocks Q1 through D-FF 301. Now that both inputs to NAND gate 302 are a logic HIGH, -TRANS is forced to a logic LOW. In addition the output of AND gate 304 is also a logic LOW signalling no collision.

The logic HIGH from END is clocked into D-FF 305 by the next rising edge of SER$_{13}$CLK which forces the —Q output of D-FF 305 to a logic LOW. The logic LOW from D-FF 305 causes —TRANS, and the output of gate 304, to return to a logic HIGH. Before the next rising edge of SER$_{13}$CLK, —END will change to a logic HIGH causing gate 304 to output a logic LOW. From here it can be seen that serial-to-parallel converter 306 does not clock in a logic HIGH and thus —ENDD (—END_Delayed) will always a logic HIGH.

The second state of normal select activity is analogous to the first state since Q1 will return to a logic HIGH before the falling edge of —END.

The third state occurs when —SEL and —END overlap. If —END is active before —SEL or they occur simultaneously then normal state one events occur. If —SEL becomes active before —END, then Q1 will change to a logic LOW. When —END does become active, the logic LOW from Q1 will be clocked into D-FF 301. Now that D-FF 301 is generating a logic LOW, gate 302 generates a logic HIGH blocking the transfer and 304 generates a logic HIGH signalling a collision. The next rising edge of SER_CLK will clock the logic HIGH from gate 304 into serial-to-parallel converter 306 and also clear D-FF 301 through D-FF 305. Before the next rising edge of SER_CLK, —END will change to a logic HIGH causing gate 304 to output a logic LOW. After three rising edges of SER_CLK, —ENDD will change to a logic LOW changing END to a logic HIGH. The process is repeated until —SEL is no longer active. Once -ENDD becomes a logic LOW and -SEL is no longer active, normal state one events occur.

It is apparent to those skilled in the art that a few restrictions are placed on the relationship of the input signals. Signal -END must change states on the falling edge of SER_CLK and must have a duration of between one clock cycle and one and one-half clock cycle of SER_CLK. Signal —SEL must have a duration greater than —END. Also, the number of clock cycles that —ENDD is delayed can be adjusted by selecting the appropriate output of serial-to-parallel converter 306.

In summary, the circuit of the present invention provides a signal (—TRANS) which allows data to be transferred from serial-to-parallel converter 100 to latch 102 and from latch 103 to parallel-to-serial converter 101. The transfer is allowed at the end of the assigned time slot provided that microprocessor 106 is not accessing the data. If microprocessor 106 is accessing the data, then the transfer is delayed for three clock cycles of the serial clock (SER_CLK). After the delay, if microprocessor 106 is still accessing the data, the transfer is delayed again. The delaying continues until microprocessor 106 is no longer accessing which time transfer is allowed.

Although the preferred embodiment of the invention has been illustrated, and that form described, it will be readily apparent to those skilled in the art that various modifications may be made therein without departing from the spirit of the invention or from the scope of the appended claims.

What is claimed is:

1. A synchronizing circuit for generating a transfer signal arranged to indicate when data is to be transferred through an interface circuit, said interface circuit connected between a microprocessor system and a time-division-multiplexed system, said time-division-multiplexed system includes a bit clock signal which defines individual bits within the time-division-multiplexed system, said synchronizing circuit comprising:

collision detection means connected to said time-division-multiplexed system and said microprocessor system, said collision detection means arranged to generate said transfer signal when a request for use of said interface circuit is received from either said time-division-multiplexed system or said microprocessor system, and alternatively, said collision detection means further arranged to generate a collision signal when said time-division-multiplexed system and said microprocessor system request use of said interface circuit simultaneously;

delay means for delaying said collision signal from said collision detection means, including an input arranged to receive said collision signal and an output arranged to transmit a delayed collision signal to said collision detection means, and;

responsive to said collision detection means receiving said delayed collision signal said collision detection means continues to generate said collision signal until said microprocessor system retracts the request for use of said interface circuit.

2. A synchronizing circuit as claimed in claim 1, wherein: said delay means is a serial-to-parallel converter having a first input arranged to receive said collision signal, a second input arranged to receive said bit clock signal from said time-division-multiplexed system, whereby said serial-to-parallel converter generates said delayed collision signal.

3. A synchronizing circuit as claimed in claim 1, wherein: said collision detection means comprises: first latch means arranged to latch a request signal from said microprocessor system;

second latch means arranged to latch said latched request signal from said first latch means in response to said second latch means receiving an end signal from said time-division-multiplexed system indicating that said time-division-multiplexed system has completed use of said interface circuit;

first gate means arranged to generate said collision signal in response to said second latch means latching said latched request signal from said first latch means, and;

second gate means arranged to generate said transfer signal in response to said first latch means latching absences of said request signal from said microprocessor system and subsequently, said second latch means latching absence of said latched request signal from said first latch means.

4. A synchronizing circuit as claimed in claim 3, wherein: said first latch means is a first Delay Flip-Flop (D-FF), said first D-FF including a D input arranged to receive said request signal, a clock input arranged to receive said bit clock signal from said time-division-multiplexed system, whereby said first D-FF generates said latched request signal.

5. A synchronizing circuit as claimed in claim 3, wherein: said second latch means is a second Delay Flip-Flop (D-FF), said second D-FF including a D input arranged to receive said latched request signal and a clock input arranged to receive said end signal.

6. A synchronizing circuit as claimed in claim 3, wherein: said first gate means is a two-input AND gate which generates said collision signal.

7. A synchronizing circuit as claimed in claim 3, wherein: said second gate means is a two-input NAND gate which generates said transfer signal.

8. A synchronizing circuit as claimed in claim 3, wherein: said collision detection means further comprises a clear latch means arranged to force said second latch means into a clear state when said clear latch means detects the removal of said end signal from said time-division-multiplexed system.

9. A synchronizing circuit as claimed in claim 8 wherein: said clear latch means is a third Delay Flip-Flop (D-FF), said third D-FF including a D input arranged to receive said end signal and a clock input arranged to receive said bit clock signal from said time-division-multiplexed system.

10. A synchronizing circuit for generating a transfer signal arranged to indicate when data is to be transferred through an interface circuit, said interface circuit connected between a microprocessor system and a time-division-multiplexed system, said time-division-multiplexed system includes a bit clock signal which defines individual bits within the time-division-multiplexed system, said synchronizing circuit comprising:

first latch means arranged to latch a request signal from said microprocessor system when said microprocessor system is requesting use of said interface circuit;

second latch means arranged to latch said latched request signal from said first latch means in response to said second latch means receiving an end signal from said time-division-multiplexed system indicating that said time-division-multiplexed system has completed use of said interface circuit;

first gate means arranged to generate a collision signal in response to said second latch means latching said latched request signal from said first latch means;

second gate means arranged to generate said transfer signal in response to said first latch means latching absences of said request signal from said microprocessor system and subsequently, said second latch means latching absence of said latched request signal from said first latch means;

clear latch means arranged to force said second latch means into a clear state when said clear latch means detects the removal of said end signal from said time-division-multiplexed system;

serial-to-parallel converter having a first input arranged to receive said collision signal and a second input arranged to receive said bit clock signal from said time-division-multiplexed system, said serial-to-parallel converter arranged to generate and output a delayed collision signal to said second latch means, and;

responsive to said second latch means receiving said delayed collision signal said first gate means continues to generate said collision signal until said microprocessor system retracts said request signal.

* * * * *